United States Patent [19]
Mizuguchi et al.

[11] Patent Number: 5,444,711
[45] Date of Patent: Aug. 22, 1995

[54] HDTV SIGNAL TRANSMSSION APPARATUS

[75] Inventors: Noboru Mizuguchi, Osaka; Kiyoshi Uchimura, Hirakata; Masatoshi Tanaka, Kashiwara; Seiho Kitaji, Yokohama, all of Japan

[73] Assignee: Matsushita Electric Industrial Co., Ltd., Kadoma, Japan

[21] Appl. No.: 172,121

[22] Filed: Dec. 21, 1993

[30] Foreign Application Priority Data

Dec. 22, 1992 [JP] Japan .................................. 4-341927

[51] Int. Cl.⁶ .............................................. H04J 3/00
[52] U.S. Cl. ........................................ 370/99; 370/60; 370/112; 358/469
[58] Field of Search ................. 370/99, 105.1, 105.2, 370/105.4, 110.1, 112, 60; 455/38.3, 38.4; 358/469

[56] References Cited

U.S. PATENT DOCUMENTS

| | | | |
|---|---|---|---|
| 4,890,283 | 12/1989 | Toinberg et al. | 370/112 |
| 5,168,356 | 12/1992 | Acampora et al. | 370/110.1 |
| 5,173,901 | 12/1992 | DeSomer | 370/112 |
| 5,251,209 | 10/1993 | Jurkevich et al. | 320/60 |
| 5,287,360 | 2/1994 | Regent | 370/112 |

FOREIGN PATENT DOCUMENTS 3-148994  6/1991  Japan .

*Primary Examiner*—Douglas W. Olms
*Assistant Examiner*—Shick Hom
*Attorney, Agent, or Firm*—Ratner & Prestia

[57] ABSTRACT

An HDTV signal transmission system for sending a 10-bit-parallel YPbPr-format HDTV signal converted to ten C4 containers, and further to the SDH (a new synchronous digital network) STM-16 frame for transmission based on CCITT recommendations. The system includes a transmitter and receiver. The transmitter has time dividers for time-based dividing the HDTV signal into eight separated video signals, a C4 container device for multiplexing the eight separated video signals to ten C4 containers, and a STM-16 framing device for reformatting the ten C4 containers to the STM-16 frame. The receiver has an STM-16 deframing device for separating the ten C4 containers from the STM-16 frame, a C4 de-container device for demultiplexing the ten C4 containers to eight separated video signals, and time-division multiplexers for time-division multiplexing the separated video signals to the 10-bit-parallel YPbPr-format HDTV signal.

17 Claims, 18 Drawing Sheets

Fig.3

| | Tn | Tn+1 | Tn+2 | Tn+3 | |
|---|---|---|---|---|---|
| MSB | Y#1(9) | Y#2(9) | Y#3(9) | Y#4(9) | --- |
| --- | Y#1(8) | Y#2(8) | Y#3(8) | Y#4(8) | --- |
| --- | Y#1(7) | Y#2(7) | Y#3(7) | Y#4(7) | --- |
| --- | Y#1(6) | Y#2(6) | Y#3(6) | Y#4(6) | --- |
| --- | Y#1(5) | Y#2(5) | Y#3(5) | Y#4(5) | --- |
| --- | Y#1(4) | Y#2(4) | Y#3(4) | Y#4(4) | --- |
| --- | Y#1(3) | Y#2(3) | Y#3(3) | Y#4(3) | --- |
| --- | Y#1(2) | Y#2(2) | Y#3(2) | Y#4(2) | --- |
| --- | Y#1(1) | Y#2(1) | Y#3(1) | Y#4(1) | --- |
| LSB | Y#1(0) | Y#2(0) | Y#3(0) | Y#4(0) | --- | a1,a1' (LUMI)

| | Tn | Tn+1 | Tn+2 | Tn+3 | |
|---|---|---|---|---|---|
| MSB | Pb#1(9) | Pr#1(9) | Pb#2(9) | Pr#2(9) | --- |
| --- | pb#1(8) | rb#1(8) | Pb#2(8) | Pr#2(8) | --- |
| --- | Pb#1(7) | Pr#1(7) | Pb#2(7) | Pr#2(7) | --- |
| --- | Pb#1(6) | Pr#1(6) | Pb#2(6) | Pr#2(6) | --- |
| --- | Pb#1(5) | Pr#1(5) | Pb#2(5) | Pr#4(5) | --- |
| --- | Pb#1(4) | Pr#1(4) | Pb#2(4) | Pr#4(4) | --- |
| --- | Pb#1(3) | Pr#1(3) | Pb#2(3) | Pr#2(3) | --- |
| --- | Pb#1(2) | Pr#1(2) | Pb#2(2) | Pr#2(2) | --- |
| --- | Pb#1(1) | Pr#1(1) | Pb#2(1) | Pr#2(1) | --- |
| LSB | Pb#1(0) | Pr#1(0) | Pb#2(0) | Pr#2(0) | --- | a2,a2' (COLOR DIFF)

$Y_{\#n}(m)$ : nTH HDTV LUMINANCE SIGNAL, mTH BIT
$Pb_{\#n}(m)$ : nTH HDTV COLOR DIFFERENCE Pb SIGNAL, mTH BIT
$Pr_{\#n}(m)$ : nTH HDTV COLOR DIFFERENCE Pr SIGNAL, mTH BIT

Fig.6

| d1,d1'<br>C4#1 | d2,d2'<br>C4#2 | d3,d3'<br>C4#3 | d4,d4'<br>C4#4 | d5,d5'<br>C4#5 | d6,d6'<br>C4#6 | d7,d7'<br>C4#7 | d8,d8'<br>C4#8 |
|---|---|---|---|---|---|---|---|
| Y#1(9) | Y#1(8) | Y#1(7) | Y#1(6) | Y#1(5) | Y#1(4) | Y#1(3) | Y#1(2) |
| Y#2(9) | Y#2(8) | Y#2(7) | Y#2(6) | Y#2(5) | Y#2(4) | Y#2(3) | Y#2(2) |
| Y#3(9) | Y#3(8) | Y#3(7) | Y#3(6) | Y#3(5) | Y#3(4) | Y#3(3) | Y#3(2) |
| Y#4(9) | Y#4(8) | Y#4(7) | Y#4(6) | Y#4(5) | Y#4(4) | Y#4(3) | Y#4(2) |
| Pb#1(9) | Pb#1(8) | Pb#1(7) | Pb#1(6) | Pb#1(5) | Pb#1(4) | Pb#1(3) | Pb#1(2) |
| Pr#1(9) | Pr#1(8) | Pr#1(7) | Pr#1(6) | Pr#1(5) | Pr#1(4) | Pr#1(3) | Pr#1(2) |
| Pb#2(9) | Pb#2(8) | Pb#2(7) | Pb#2(6) | Pb#2(5) | Pb#2(4) | Pb#2(3) | Pb#2(2) |
| Pr#2(9) | Pr#2(8) | Pr#2(7) | Pr#2(6) | Pr#2(5) | Pr#2(4) | Pr#2(3) | Pr#2(2) |

| d9,d9'<br>C4#9 | d10,d10'<br>C4#10 |
|---|---|
| Y#1(1) | Y#1(0) |
| Y#2(1) | Y#2(0) |
| Y#3(1) | Y#3(0) |
| Y#4(1) | Y#4(0) |
| Pb#1(1) | Pb#1(0) |
| Pr#1(1) | Pr#1(0) |
| Pb#2(1) | Pb#2(0) |
| Pr#2(1) | Pr#2(0) |

Fig.10

|  |  | Tn | Tn+1 | Tn+2 | Tn+3 |  |
|---|---|---|---|---|---|---|
| e1,e1' (G) | MSB --- | G#1(9) | G#2(9) | G#3(9) | G#4(9) | --- |
|  | --- | G#1(8) | G#2(8) | G#3(8) | G#4(8) | --- |
|  | --- | G#1(7) | G#2(7) | G#3(7) | G#4(7) | --- |
|  | --- | G#1(6) | G#2(6) | G#3(6) | G#4(6) | --- |
|  | --- | G#1(5) | G#2(5) | G#3(5) | G#4(5) | --- |
|  | --- | G#1(4) | G#2(4) | G#3(4) | G#4(4) | --- |
|  | --- | G#1(3) | G#2(3) | G#3(3) | G#4(3) | --- |
|  | --- | G#1(2) | G#2(2) | G#3(2) | G#4(2) | --- |
|  | --- | G#1(1) | G#2(1) | G#3(1) | G#4(1) | --- |
|  | LSB --- | G#1(0) | G#2(0) | G#3(0) | G#4(0) | --- |
| e2,e2' (B) | MSB --- | B#1(9) | B#2(9) | B#3(9) | B#4(9) | --- |
|  | --- | B#1(8) | B#2(8) | B#3(8) | B#4(8) | --- |
|  | --- | B#1(7) | B#2(7) | B#3(7) | B#4(7) | --- |
|  | --- | B#1(6) | B#2(6) | B#3(6) | B#4(6) | --- |
|  | --- | B#1(5) | B#2(5) | B#3(5) | B#4(5) | --- |
|  | --- | B#1(4) | B#2(4) | B#3(4) | B#4(4) | --- |
|  | --- | B#1(3) | B#2(3) | B#3(3) | B#4(3) | --- |
|  | --- | B#1(2) | B#2(2) | B#3(2) | B#4(2) | --- |
|  | --- | B#1(1) | B#2(1) | B#3(1) | B#4(1) | --- |
|  | LSB --- | B#1(0) | B#2(0) | B#3(0) | B#4(0) | --- |
| e3,e3' (R) | MSB --- | R#1(9) | R#2(9) | R#3(9) | R#4(9) | --- |
|  | --- | R#1(8) | R#2(8) | R#3(8) | R#4(8) | --- |
|  | --- | R#1(7) | R#2(7) | R#3(7) | R#4(7) | --- |
|  | --- | R#1(6) | R#2(6) | R#3(6) | R#4(6) | --- |
|  | --- | R#1(5) | R#2(5) | R#3(5) | R#4(5) | --- |
|  | --- | R#1(4) | R#2(4) | R#3(4) | R#4(4) | --- |
|  | --- | R#1(3) | R#2(3) | R#3(3) | R#4(3) | --- |
|  | --- | R#1(2) | R#2(2) | R#3(2) | R#4(2) | --- |
|  | --- | R#1(1) | R#2(1) | R#3(1) | R#4(1) | --- |
|  | LSB --- | R#1(0) | R#2(0) | R#3(0) | R#4(0) | --- |

$G_{\#n}(m)$ : nTH HDTV G SIGNAL, mTH BIT
$B_{\#n}(m)$ : nTH HDTV B SIGNAL, mTH BIT
$R_{\#n}(m)$ : nTH HDTV R SIGNAL, mTH BIT

Fig. 14

| i1,i1'<br>C4#1 | i2,i2'<br>C4#2 | i3,i3'<br>C4#3 | i4,i4'<br>C4#4 | i5,i5'<br>C4#5 | i6,i6'<br>C4#6 | i7,i7'<br>C4#7 | i8,i8'<br>C4#8 |
|---|---|---|---|---|---|---|---|
| G#1(9) | G#1(8) | G#1(7) | G#1(6) | G#1(5) | G#1(4) | G#1(3) | G#1(2) |
| G#2(9) | G#2(8) | G#2(7) | G#2(6) | G#2(5) | G#2(4) | G#2(3) | G#2(2) |
| G#3(9) | G#3(8) | G#3(7) | G#3(6) | G#3(5) | G#3(4) | G#3(3) | G#3(2) |
| G#4(9) | G#4(8) | G#4(7) | G#4(6) | G#4(5) | G#4(4) | G#4(3) | G#4(2) |
| B#1(9) | B#1(8) | B#1(7) | B#1(6) | B#1(5) | B#1(4) | B#1(3) | B#1(2) |
| B#2(9) | B#2(8) | B#2(7) | B#2(6) | B#2(5) | B#2(4) | B#2(3) | B#2(2) |
| B#3(9) | B#3(8) | B#3(7) | B#3(6) | B#3(5) | B#3(4) | B#3(3) | B#3(2) |
| B#4(9) | B#4(8) | B#4(7) | B#4(6) | B#4(5) | B#4(4) | B#4(3) | B#4(2) |

| i9,i9'<br>C4#9 | i10,i10'<br>C4#10 | i11,i11'<br>C4#11 | i12,i12'<br>C4#12 | i13,i13'<br>C4#13 | i14,i14'<br>C4#14 | i15,i15'<br>C4#15 |
|---|---|---|---|---|---|---|
| G#1(1) | G#1(0) | R#1(9) | R#1(7) | R#1(5) | R#1(3) | R#1(1) |
| G#2(1) | G#2(0) | R#2(9) | R#2(7) | R#2(5) | R#2(3) | R#2(1) |
| G#3(1) | G#3(0) | R#3(9) | R#3(7) | R#3(5) | R#3(3) | R#3(1) |
| G#4(1) | G#4(0) | R#4(9) | R#4(7) | R#4(5) | R#4(3) | R#4(1) |
| B#1(1) | B#1(0) | R#1(8) | R#1(6) | R#1(4) | R#1(2) | R#1(0) |
| B#2(1) | B#2(0) | R#2(8) | R#2(6) | R#2(4) | R#2(2) | R#2(0) |
| B#3(1) | B#3(0) | R#3(8) | R#3(6) | R#3(4) | R#3(2) | R#3(0) |
| B#4(1) | B#4(0) | R#4(8) | R#4(6) | R#4(4) | R#4(2) | R#4(0) |

HDTV SIGNAL TRANSMSSION APPARATUS

BACKGROUND OF THE INVENTION

1. Field of the Invention

The present invention relates to an HDTV signal transmission apparatus for transmitting HDTV video signals multiplexed to the STM-16 (synchronous transport module-16) frame, the transmission frame of the new digital synchronous network, "SDH (synchronous digital hierarchy) network", based on CCITT recommendations G707, G708, and G709 ("CCITT recommendations" below).

2. Description of the prior art

Transmission apparatuses for transmitting full-band HDTV digital signals ("HDTV signals" below) using the SDH network have been developed in recent years. It is essential to use a fiber-optic transmission path when transmitting uncompressed full-band HDTV signals because of the high bit rate. When used for transmission between broadcasting stations or for live broadcasts, however, transmission distances commonly exceed several ten kilometers, and long-distance laying of private fiber optic cables is extremely expensive and difficult. The SDH network is therefore used for HDTV signal transmission because of its high bit rate capacity.

A conventional HDTV signal transmission apparatus for transmitting a 10-bit/word, YPbPr-format HDTV signal (e.g., SMPTE 260M (Society of Picture and Television Engineers)) using an SDH network is described below. Note that this HDTV signal transmission apparatus comprises the HDTV signal transmitter, HDTV signal receiver, and the transmission path.

A conventional HDTV signal transmitter comprises a luminance signal input terminal to which the HDTV luminance signal is input; a color difference multiplexing signal input terminal to which the HDTV color difference multiplexing signal is input; a first time divider for 1:4 time-based dividing the HDTV luminance signal; a second time divider for 1:4 time-based dividing the HDTV color difference multiplexing signal; a C4 container device for multiplexing the 1:4 time-divided luminance and color difference multiplexing signals to sixteen C4 containers; an STM-16 framing device for multiplexing the sixteen C4 containers to the STM-16 frame according to CCITT recommendations; and an STM-16 frame output terminal for outputting the STM-16 frame.

The conventional HDTV signal transmitter thus comprised operates as follows. The HDTV luminance signal input from the luminance signal input terminal is separated into four separated luminance signals by the first time divider. The HDTV color difference multiplex signal input from the color difference multiplex signal input terminal is separated into four separated color difference multiplex signals by the second time divider. Each of the four series of separated luminance signals and separated color difference multiplex signals is multiplexed to two C4 containers, resulting in a total sixteen multiplexed C4 containers. The sixteen multiplexed C4 containers are then multiplexed to the STM-16 frame by the STM-16 framing device, and output from the STM-16 frame output terminal to the transmission path.

A conventional HDTV signal receiver comprises an STM-16 frame input terminal to which the STM-16 frame carried over the transmission path is input; an STM-16 framing device for demultiplexing the sixteen C4 containers from the STM-16 frame according to the CCITT recommendations; a C4 deframing device for demultiplexing the four time-divided separated luminance signals and separated color difference multiplex signals from the sixteen C4 containers; a first time-division multiplexer for time-division multiplexing the four separated luminance signals; a second time-division multiplexer for time-division multiplexing the four separated color difference multiplex signals; a luminance signal output terminal for outputting the HDTV luminance signal; and a color difference multiplex signal output terminal for outputting the HDTV color difference multiplex signal.

This conventional HDTV signal receiver operates as follows. The STM-16 frame is input from the STM-16 frame input terminal. The STM-16 framing device demultiplexes the sixteen C4 containers from the input STM-16 frame. The C4 deframing device demultiplexes the four time-base separated luminance signals and color difference multiplex signals from the sixteen C4 containers. The first time-division multiplexer multiplexes the four separated luminance signals to the HDTV luminance signal, and outputs the multiplexed luminance signal from the luminance signal output terminal. The second time-division multiplexer multiplexes the four separated color difference multiplex signals to the HDTV color difference multiplex signal, and outputs the result from the color difference multiplex signal output terminal.

The problem with this conventional configuration, however, is that relatively large-scale circuitry is required because a YPbPr-format HDTV signal is multiplexed to all sixteen C4 containers, and all of these C4 containers are multiplexed to the payload of the STM frame. In addition, because unused bandwidth is distributed to all C4 containers, it is difficult to transmit a GBR-format HDTV video signal, or to add additional functionality using this unused bandwidth to transfer audio signals, control signals, or other non-HDTV signals.

SUMMARY OF THE INVENTION

Therefore, an object of the present invention is to provide a compact HDTV signal transmission apparatus having good expansion capabilities by multiplexing a YPbPr-format full-band HDTV digital signal to C4 containers equal in number to the number of quantization bits.

To achieve this object, an HDTV signal transmission apparatus according to the present invention comprises a transmitter and a receiver.

The transmitter comprises: a time divider for time distribution of the YPbPr-format HDTV digital signal (e.g., SMPTE 260M) of N quantization bits (where N is a positive integer) to separated HDTV signals; a C4 container device for multiplexing the separated HDTV signals to N C4 containers; and an STM-16 framing device for multiplexing the N C4 containers to the STM-16 frame.

The receiver comprises: an STM-16 deframing device for demultiplexing the N C4 containers from the STM-16 frame; a C4 deframing device for demultiplexing the time-divided HDTV signals from the N C4 containers; a time-division multiplexer for time-division multiplexing the time-divided HDTV signals to the HDTV signal; and a transmission path carrying the STM-16 frame.

The HDTV signal transmission apparatus thus comprised operates as follows. At the transmitter side, the input HDTV signal is divided into the separated HDTV signals by the time divider, and multiplexed by the C4 container device to N C4 containers. The multiplexed C4 containers are then multiplexed to the STM-16 frame by the STM-16 framing device, and output to the transmission path. At the receiver side, the C4 containers are separated by the STM-16 deframing device from the STM-16 frame input from the transmission path, the separated HDTV signals are demultiplexed from the C4 containers by the C4 deframing device, and the separated HDTV signal is multiplexed to the HDTV signal by the time-division multiplexer.

The overall scale of the HDTV signal transmission apparatus according to the present invention can thus be reduced because the YPbPr-format HDTV signal is multiplexed to a number of C4 containers equal to the number of quantization bits. In addition, C4 containers to which an HDTV signal is not multiplexed can be used to carry audio signals and other signals, thereby easily expanding the functionality of the transmission apparatus.

BRIEF DESCRIPTION OF THE DRAWINGS

The present invention will become more fully understood from the detailed description given below and the accompanying diagrams wherein:

FIG. 3 is a format diagram of the YPbPr-format HDTV signal, FIG. 6 is a format diagram of C4 container multiplexing in the first embodiment of the invention, FIG. 10 is a format diagram of the GBR-format HDTV signal, FIG. 14 is a format diagram of C4 container multiplexing in the second embodiment the present invention.

DESCRIPTION OF PREFERRED EMBODIMENTS

Figure 1A:
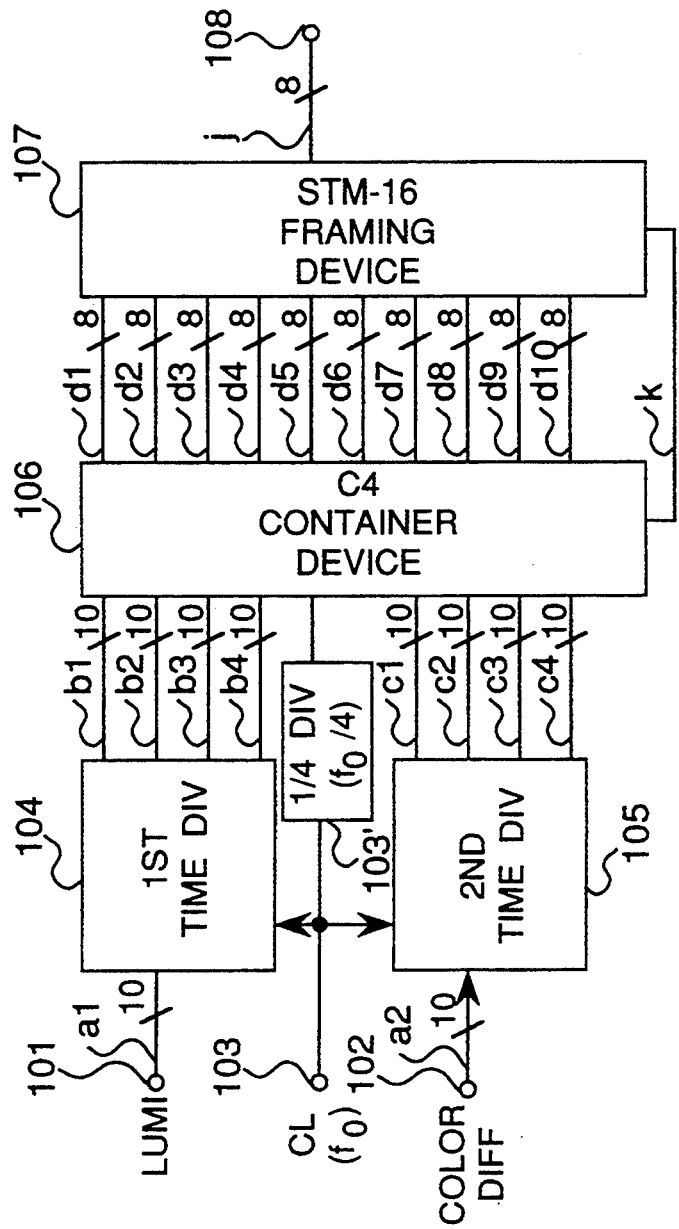
FIGS. 1a and 1b are block diagram and circuit diagram, respectively, of an HDTV signal transmitting apparatus according to the first embodiment of the present invention.
Figure 1B:
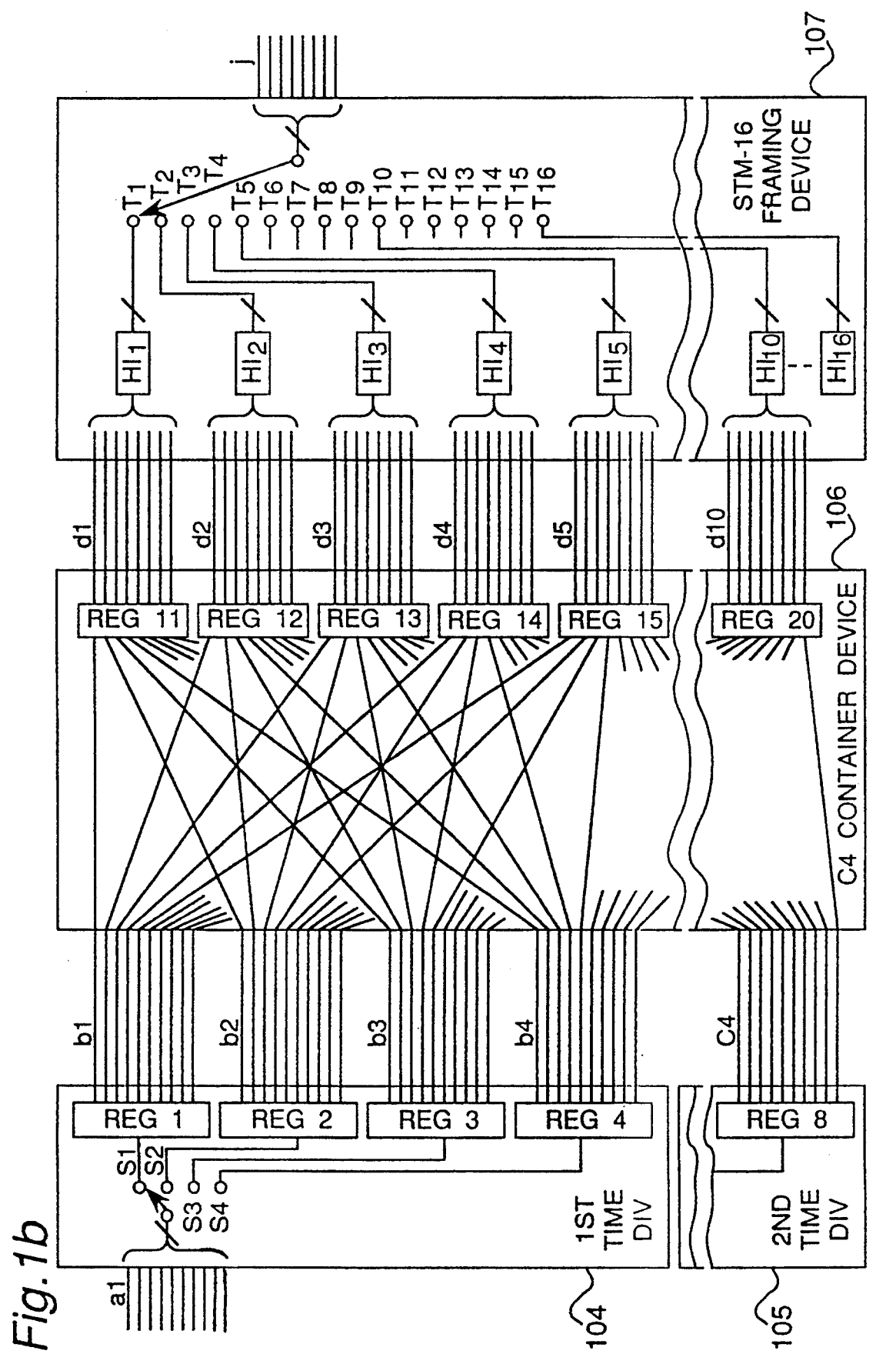
Figure 1C:
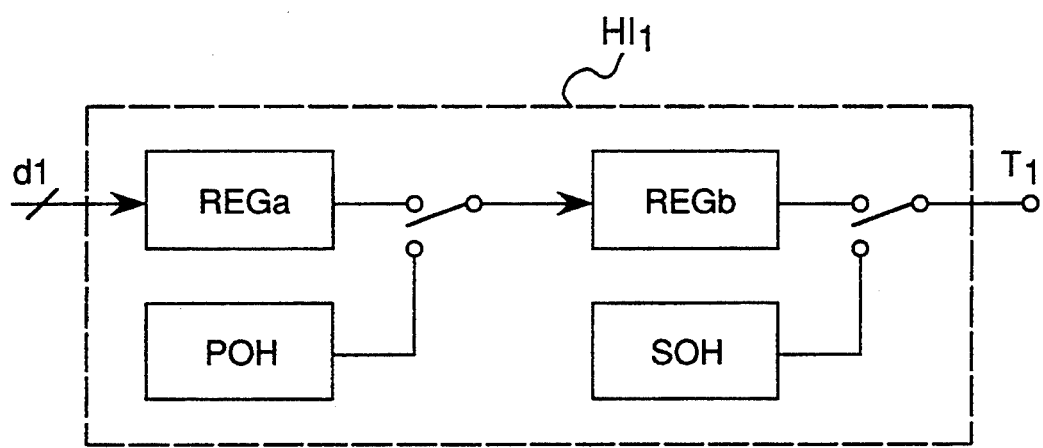
FIG. 1c is a block diagram of a header insertion device of FIG. 1b, FIGS. 2a and 2b are block diagram and circuit diagram, respectively, of an HDTV signal receiving apparatus according to the first embodiment of the present invention.
Figure 2C:
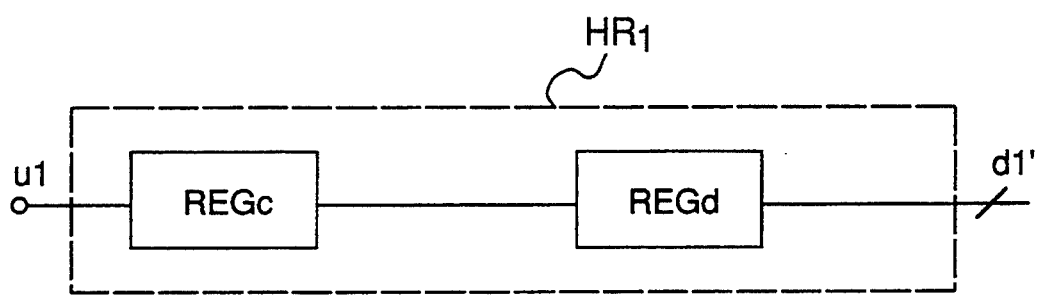
FIG. 2c is a block diagram of a header remover of FIG. 2b.
Figure 2A:
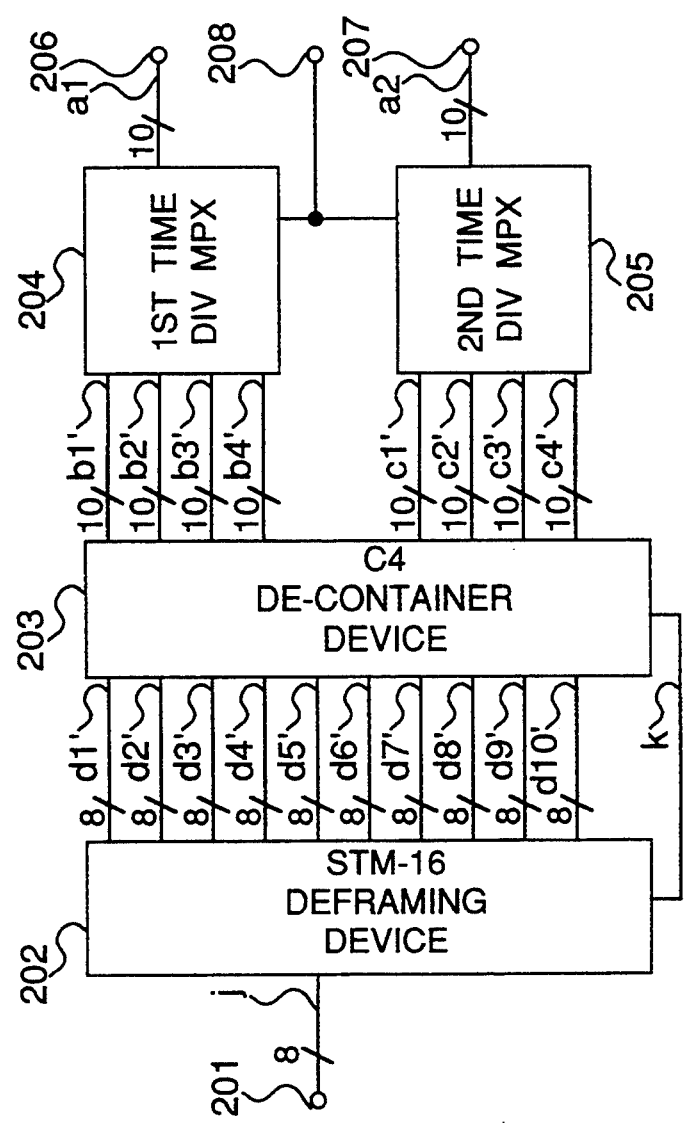
Figure 2B:
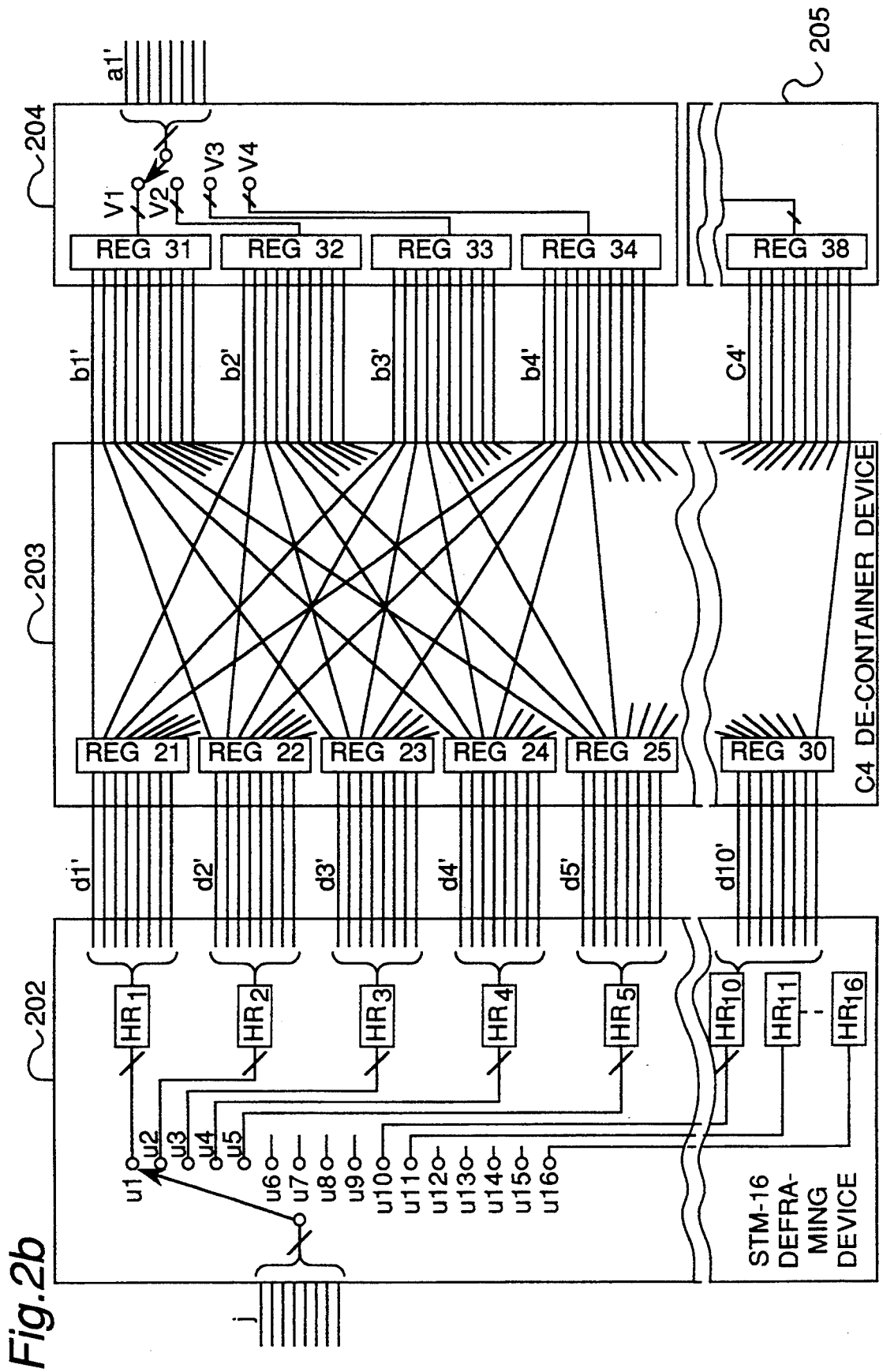

The first embodiment of an HDTV signal transmission apparatus is described below with reference to FIGS. 1-7, of which FIGS. 1a and 1b are block diagram and partial circuit diagram of a transmitter and FIGS. 2a and 2b are block diagram and partial circuit diagram of a receiver in an HDTV signal transmission apparatus according to the present invention. The transmitted HDTV signal in this example is a 10-bit/word (i.e., ten quantization bits) YPbPr-format signal conforming, for example, to SMPTE 260M.

The HDTV signal transmitter is described first with reference to FIGS. 1a and 1b.

The transmitter comprises a luminance signal input terminal 101 to which the HDTV luminance signal through a 10-bit-parallel transfer line a1 is input; a color difference multiplex signal input terminal 102 to which the HDTV color difference multiplex signal through a 10-bit-parallel transfer line a2 is input; and a video clock input terminal 103 to which a video clock (of=74.25 MHz) is input. The transmitter further comprises a first time divider 104, a second time divider 105, a ¼ frequency divider 103' for dividing the video clock to produce a ¼of clock; a C4 container device 106, and an STM-16 framing device 107. According to one preferred embodiment, the quantization bit rate of the signal along line a1 is 10 bit/sampling at 74.25 MHz, and the quantization bit rate of the signal along line a2 is 10 bit/sampling at 37.125 MHz (which is half the 74.25 MHz) for each of Pb and Pr signals.

As shown in FIG. 1b, the first time divider 104 has a switch for separating the input to four outputs at terminals S1, S2, S3 and S4, and four registers REG1, REG2, REG3 and REG4. Registers REG1, REG2, REG3 and REG4 have 10-bit-parallel transfer lines b1, b2, b3 and b4, respectively. Similarly, the second time divider 105 has a switch (not shown) for separating the input to four outputs at four terminals, and four registers (only REG8 is shown which has 10-bit-parallel transfer line c4).

In response to the first video clock at time $T_n$ (FIG. 3), one word data (10 bit data Y#1 in FIG. 3) of the luminance signal is transmitted along 10-bit-parallel transfer line a1 and is applied to register REG1 through the first terminal S1. Similarly, in response to the same first video clock one word data (10 bit data Pb#1 in FIG. 3) of the color difference signal is transmitted along 10-bit-parallel transfer line a2 and is applied to register REG5 (not shown) through the first terminal S5 (not shown).

In response to the second video clock at time $T_{n+1}$, one word data (10 bit data Y#2) of the luminance signal is transmitted along 10-bit-parallel transfer line a1 and is applied to register REG2 through the first terminal S2. A similar operation is being carried out for the color difference signal Pb#2.

In response to the third video clock at time $T_{n+2}$, one word data (10 bit data Y#3) of the luminance signal is transmitted along 10-bit-parallel transfer line a1 and is applied to register REG3 through the first terminal S3. A similar operation is being carried out for the color difference signal Pb#3.

In response to the fourth video clock at time $T_{n+3}$, one word data (10 bit data Y#4) of the luminance signal is transmitted along 10-bit-parallel transfer line a1 and is applied to register REG4 through the first terminal S4.

A similar operation is being carried out for the color difference signal Pb#4.

Figure 4:
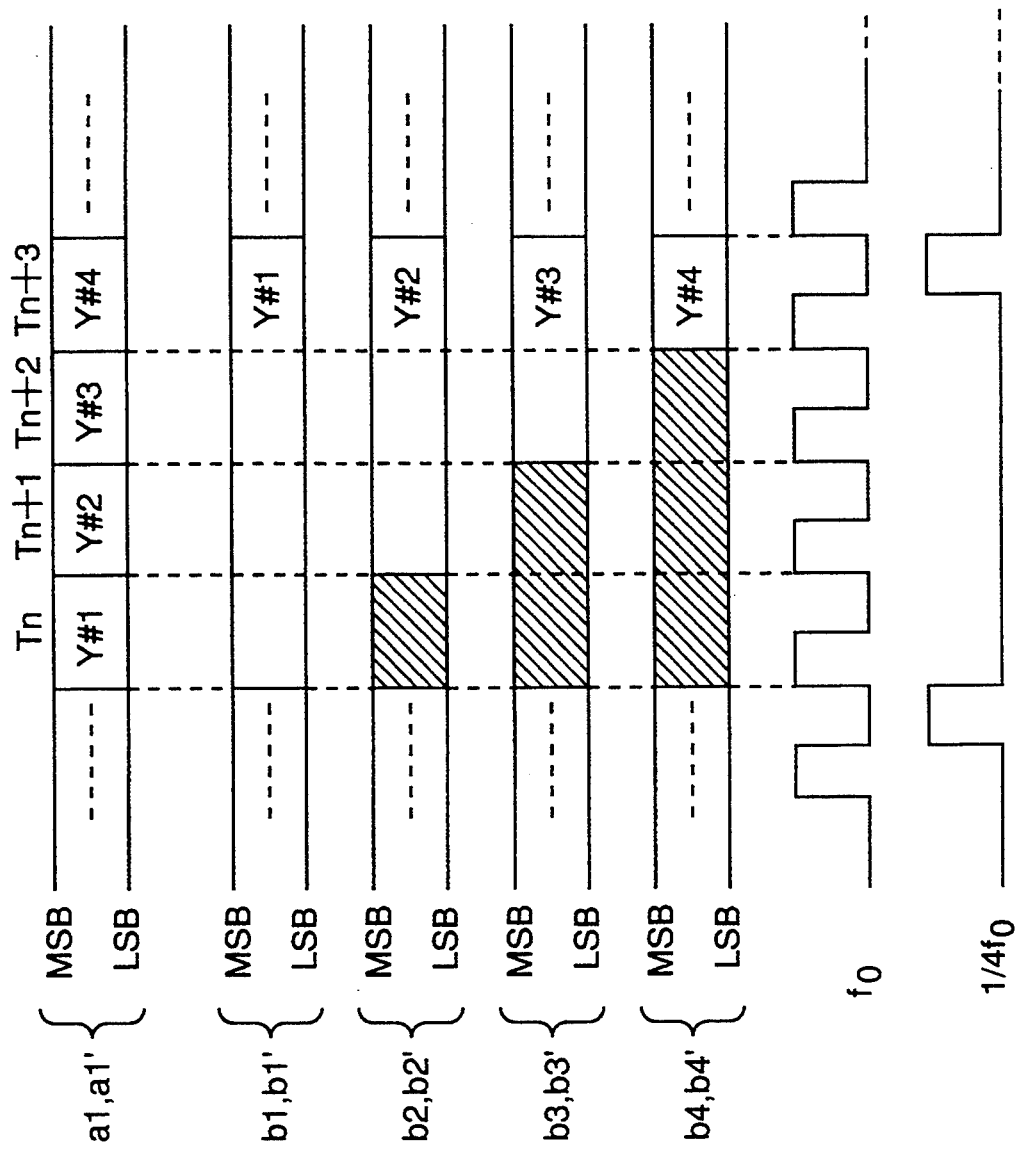
FIG. 4 is a format diagram of the separated luminance signal.
Figure 5:
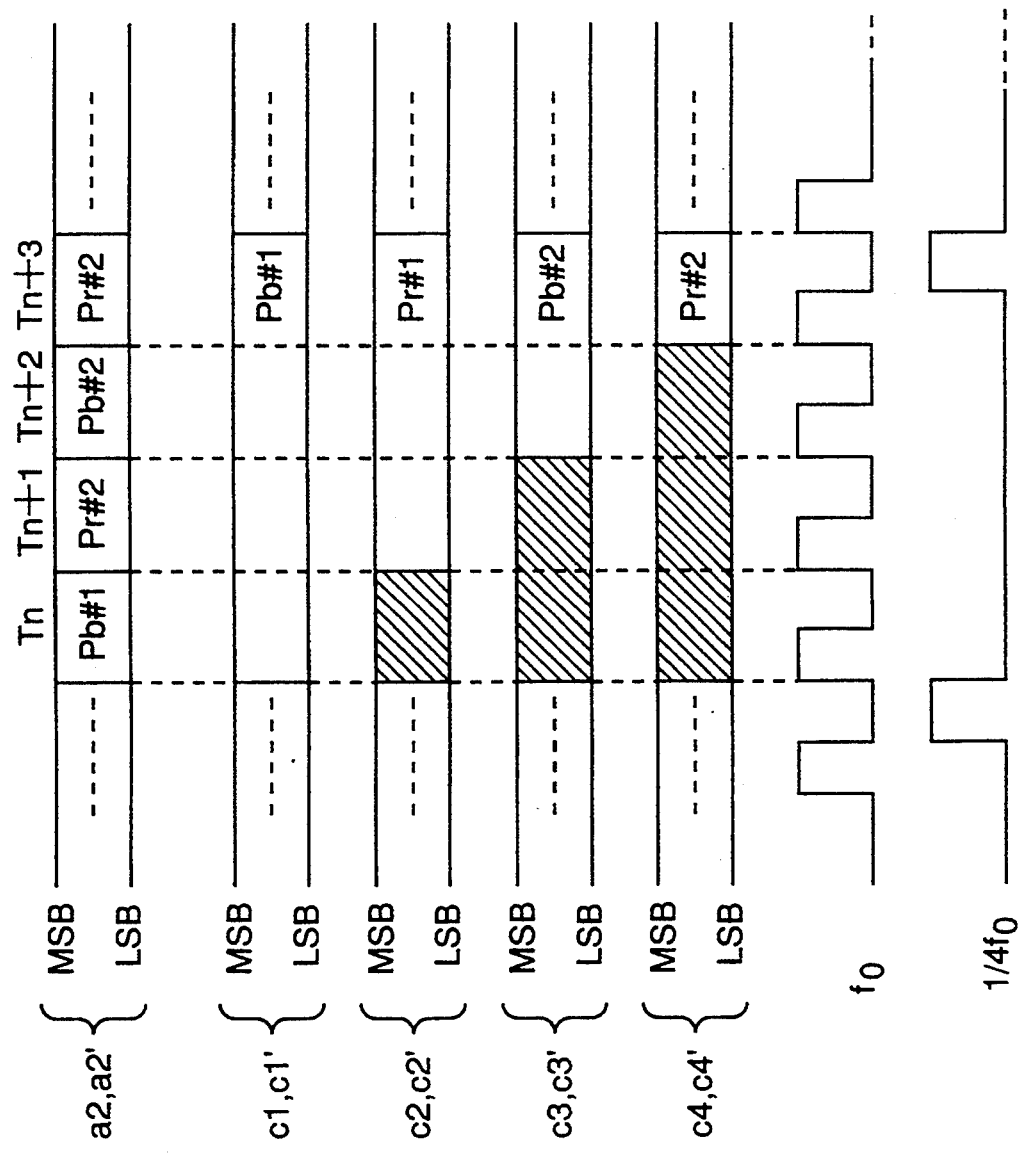
FIG. 5 is a format diagram of the separated color difference multiplex signal.

The data now carried in these registers REG1–REG8 is referred to as one block data. Immediately after the fourth video clock, a first ½ of clock is applied to C4 container device 106 for entering the data carried in register REG1–REG8 to C4 container device 106 along lines b1, b2, b3, b4, c1, c2, c3 and c4. The timing chart for storing data in registers REG1–REG8 is shown in FIGS. 4 and 5.

As shown in FIG. 1b, the C4 container device 106 has ten registers REG11–REG20 which are further connected to ten 8-bit-parallel transfer lines d1–d10, respectively. The first bit of the first 10-bit-parallel transfer line b1 is connected to the first bit of the first register REG11. The second bit of the first line b1 is connected to the first bit of the second register REG12. In this manner, the Nth bit of the first line b1 is connected to the first bit of the Nth register.

Similarly, the first bit of the second 10-bit-parallel transfer line b2 is connected to the second bit of the first register REG11. The second bit of the second line b2 is connected to the second bit of the second register REG12. In this manner, the Nth bit of the second line b2 is connected to the second bit of the Nth register.

In general, in the C4 container device 106, the Nth bit of the Mth input parallel line is connected to the Mth bit of the Nth register.

Thus, in response to the first ½ of clock, the data in eight registers REG1–REG8 in the first and second time dividers 104 and 105 are shifted to ten registers REG11–REG20 in the C4 container device 106. The data as stored in registers REG11–REG20 define one block data and are shown in FIG. 6. Thus, the data contained in each of the registers REG11–REG20 is referred to as a sub-block data. The sub-block data from registers REG11–REG20 are simultaneously outputted in response to clock k.

Figure 7:
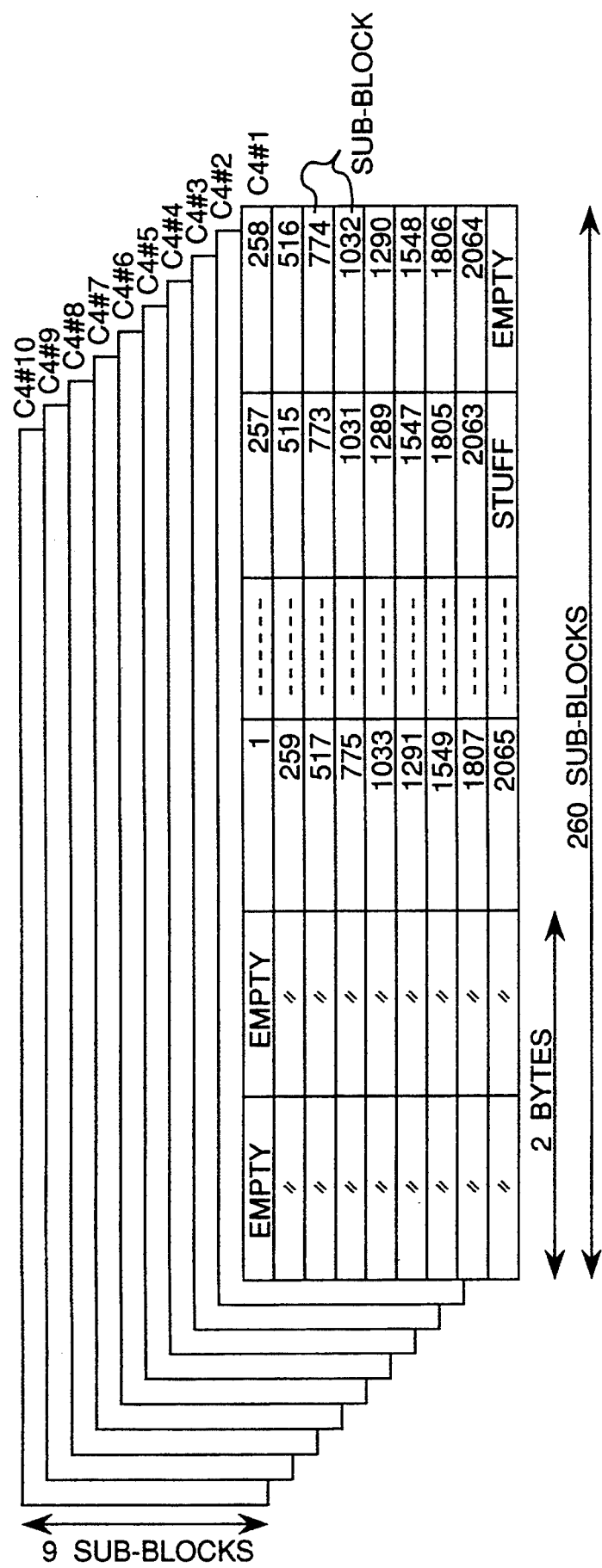
FIG. 7 is a format diagram of video block multiplexing in the first embodiment of the invention.

As shown in FIG. 7, 2340 (=260×9) sub-blocks serially produced from one register form a frame called C4 container. Thus, from registers REG11–REG20, ten C4 containers C4#1–C4#10, as shown in FIG. 7, are produced parallel after the generation of 2340 sub-blocks from each of the registers.

The STM-16 framing device 107 has sixteen header insertion devices HI1–HI16 in which ten header insertion devices HI1–HI10 are connected to ten transfer lines d1–d10, respectively. The sixteen header insertion devices HI1–HI16 are connected to terminals T1–T16, respectively, of a switching device. The output of the switching device is connected to an output 108 through 8-bit-parallel transfer line j for data transmission to a receiver shown in FIGS. 2a and 2b.

Referring to FIG. 1c, a detail of header insertion device HI1 is shown. The other header insertion devices HI2–HI16 have the same structure as that of header insertion device HI1. The header insertion device HI1 includes registers REGa and REGb, path over header supplier POH, section over header supplier SOH and two switches. Normally two switches are turned to registers REGa and REGb as shown in FIG. 1c so that the data from the C4 container device 106 are transmitted through the header insertion device HI1.

The first switch is turned to POH at the beginning of each of nine sections in each C4 containers, i.e., before the first sub-block of one section (260 sub-blocks), so as to insert nine sub-blocks of POH to define a VC4 container. During the switch being turned to POH, the register REGa serves as a buffer to hold data. Thus, the register REGa produces 2349 sub-blocks defining the VC4 container.

The second switch is turned to SOH at some fixed place in each of nine sections, so as to insert nine sub-blocks of SOH to define an STM-1 frame. During the switch being turned to SOH, the register REGb serves as a buffer to hold data. Thus, the register REGb produces 2430 sub-blocks defining STM-1 frame. The insertion of nine headers from POH and nine headers from SOH is based on a format determined by the CCITT recommendations.

In this manner, the sixteen header insertion devices HI1–HI16 operate in the same manner, synchronizingly. When the sixteen header insertion devices HI1–HI16 each produces 2430 sub-blocks, sixteen STM-1 frames are produced parallel. Note that, according to the first embodiment, ten STM-1 frames produced from the first ten header insertion devices HI1–HI10 carry meaningful data obtained from lines a1 and a2, but the remaining STM-1 frames produced from the last six header insertion devices HI11–HI16 carry meaningless data. Thus, the STM-1 frames produced from the last six header insertion devices HI11–HI16 may be used for carrying some other meaningful data, such as audio data or some other data, as arranged in the second embodiment.

Referring to FIG. 1b, during one sub-block data is being outputted from each of the sixteen header insertion devices HI1–HI16, i.e., during one sub-block transmission period, terminals T1–T16 are sequentially switched to sequentially produce sixteen sub-block data. Thus, when the sixteen header insertion devices HI1–HI16 produce 2430 sub-blocks from each, it is understood that sixteen STM-1 frames are produced parallel from devices HI1–HI16. These sixteen STM-1 frames are interleaved by the switching of terminals T1–T16 to produce an STM-16 frame.

The operation of the HDTV signal transmitter thus comprised is described below.

The HDTV luminance signal (a1 in FIGS. 3 and 4) input from the luminance signal input terminal 101 is divided into four separated luminance signals (b1–b4, FIG. 4) by the first time divider 104. The HDTV color difference multiplex signal (a2 in FIGS. 3 and 5) input from the color difference multiplex signal input terminal 102 is divided into four separated color difference multiplex signals (c1–c4, FIG. 5) by the second time divider 105.

Based on the video clock and the C4 clock (k), the C4 framing device 106 frames one block (d1–d10, FIG. 6) from the series of four separated luminance signals and color difference multiplex signals, and staff multiplexes this block to ten C4 frames (FIG. 7). As shown in FIG. 7, one block is distributed across the ten C4 frames C4#1–C4#10, each of which is (FIG. 6) multiplexed.

The ten multiplexed C4 frames are then multiplexed to STM-16 frame (j) by the STM-16 framing device 107, and output from the STM-16 frame output terminal 108 to the transmission path.

Referring next to FIGS. 2a and 2b, the HDTV receiver is described.

The receiver comprises an STM-16 frame input terminal 201 to which the STM-16 frame transmitted over the transmission path is input through 8-bit-parallel transfer line j, and a STM-16 deframing device 202 for demultiplexing the ten C4 containers from the STM-16 frame according to CCITT recommendations, and for generating the C4 clock. A C4 decontainer device 203 is provided for demultiplexing the four separated luminance signals and color difference multiplex signals by destuffing from the ten C4 containers based on the C4 clock, and generating the video clock. A first time-division multiplexer 204 is provided which receives the video clock and four separated luminance signals for time-division multiplexing and produces the HDTV luminance signal through 10-bit-parallel transfer line a1' and further to output terminal 206. A second time-division multiplexer 205 is provided which receives the video clock and four separated color difference multiplex signals for time-division multiplexing of the separated color difference multiplex signals and produces the HDTV color difference multiplex signal through 10-bit-parallel transfer line a2' and further to output terminal 207. The video clock is produced from a video clock output terminal 208.

Referring to FIG. 2b, the STM-16 deframing device 202 has a switching device having one input connected to 8-bit-parallel transfer line J, and sixteen outputs U1–U16 connected to sixteen header removers HR1–HR16, respectively. As shown in FIG. 2c, the header remover HR1 has two registers REGc and REGd. Register REGc is provided for removing the path over header inserted at supplier POH, and Register REGd is provided for removing the section over header inserted at supplier POH. Of the sixteen header removers HR1–HR16, the first ten header removers HR1–HR10 are connected to ten 8-bit-parallel transfer lines d1'–d10' (FIG. 2b).

The C4 de-container device 203 has ten registers REG21–REG30 connected respectively to ten 8-bit-parallel transfer lines d1'–d10'. During one sub-block transmission period, the switching device is switched sequentially to connect the line j to terminals U1–U16. Thus, during one sub-block transmission period, each of registers REG21–REG30 is stored with one sub-block. The ten registers REG21–REG30 are connected to eight 10-bit-parallel transfer lines b1'–b4' and c1'–c4' in a manner described below.

The first bit of the first register REG21 is connected to the first bit of the first 10-bit-parallel transfer line b1'. The second bit of the first register REG21 is connected to the first bit of the second output line b2'. In this manner, the Nth bit of the first register 21 is connected to the first bit of the Nth output line.

Similarly, the first bit of the second register REG22 is connected to the second bit of the first 10-bit-parallel transfer line b1'. The second bit of the second register REG22 line b2 is connected to the second bit of the second output line b2'. In this manner, the Nth bit of the second register REG22 is connected to the second bit of the Nth output line.

In general, in the C4 de-container device 203, the Nth bit of the Mth register is connected to the Mth bit of the Nth output line.

Thus, the ten sub-blocks in ten registers REG21–REG30 are transmitted to eight 10-bit-parallel transfer output lines b1'–b4' and c1'–c4', and define one block.

The first time-division multiplexer 204 has four registers REG31–REG34 which receives lines b1'–b4', respectively. The output of the four registers REG31–REG34 are connected to four terminals V1, V2, V3 and V4, respectively, of a switching device. The terminals V1–V4 are switched sequentially to produce the HDTV luminance signal in the same order as that was applied to the input terminal 101 (FIG. 1a).

The second time-division multiplexer 205 has four registers REG35–REG38 (only REG38 is shown in FIG. 2b) which receives lines c1'–c4' (only line c4' is shown in FIG. 2b), respectively. The output of the four registers REG35–REG38 are connected to four terminals, respectively, of a switching device (not shown) in a similar manner to switching device for the luminance signal. The four terminals are switched sequentially to produce the HDTV color difference multiplex signal in the same order as that was applied to the input terminal 102 (FIG. 1a).

It is to be noted that any of the registers described herein can be formed by a FIFO.

The operation of the HDTV signal receiver thus comprised is described below.

The STM-16 frame (j) is input from the STM-16 frame input terminal 201 to the STM-16 deframing device 202 for demultiplexing the ten C4 containers (d1'–d10', FIGS. 6 and 7) from the input STM-16 frame. The STM-16 deframing device 202 also generates the C4 clock (k).

The C4 de-container device 203 frequency-converts by destuffing and demultiplexes the four time-divided luminance signals (b1'–b4', FIG. 4) and color difference multiplex signals (c1'–c4', FIG. 5) from the ten C4 containers. The C4 de-container device 203 also generates the video clock.

The first time-division multiplexer 204 multiplexes the four separated luminance signals (a1', FIGS. 3 and 4) to the HDTV luminance signal, and outputs the multiplexed signal from the luminance signal output terminal 206.

The second time-division multiplexer 205 multiplexes the four separated color difference multiplex signals to the HDTV color difference multiplex signal (a2', FIGS. 3 and 5), and outputs the result from the color difference multiplex signal output terminal 207. The video clock is output from the video clock output terminal 208.

The transmitter and receiver of the present embodiment can thus be compactly achieved because the 10-bit/word YPbPr-format HDTV signal is multiplexed to ten C4 containers. In addition, the functionality of the transmission system can be easily expanded because signals other than the HDTV signal (e.g., audio signals) can be simultaneously transmitted using the unused C4 containers.

It is to be noted that while ten quantization bits are used in the above embodiment, the invention shall not be so limited and a similar effect can be achieved when the number of quantization bits is within the range 5–15, inclusive, by simply changing the number of C4 containers used for transmission.

Figure 8:
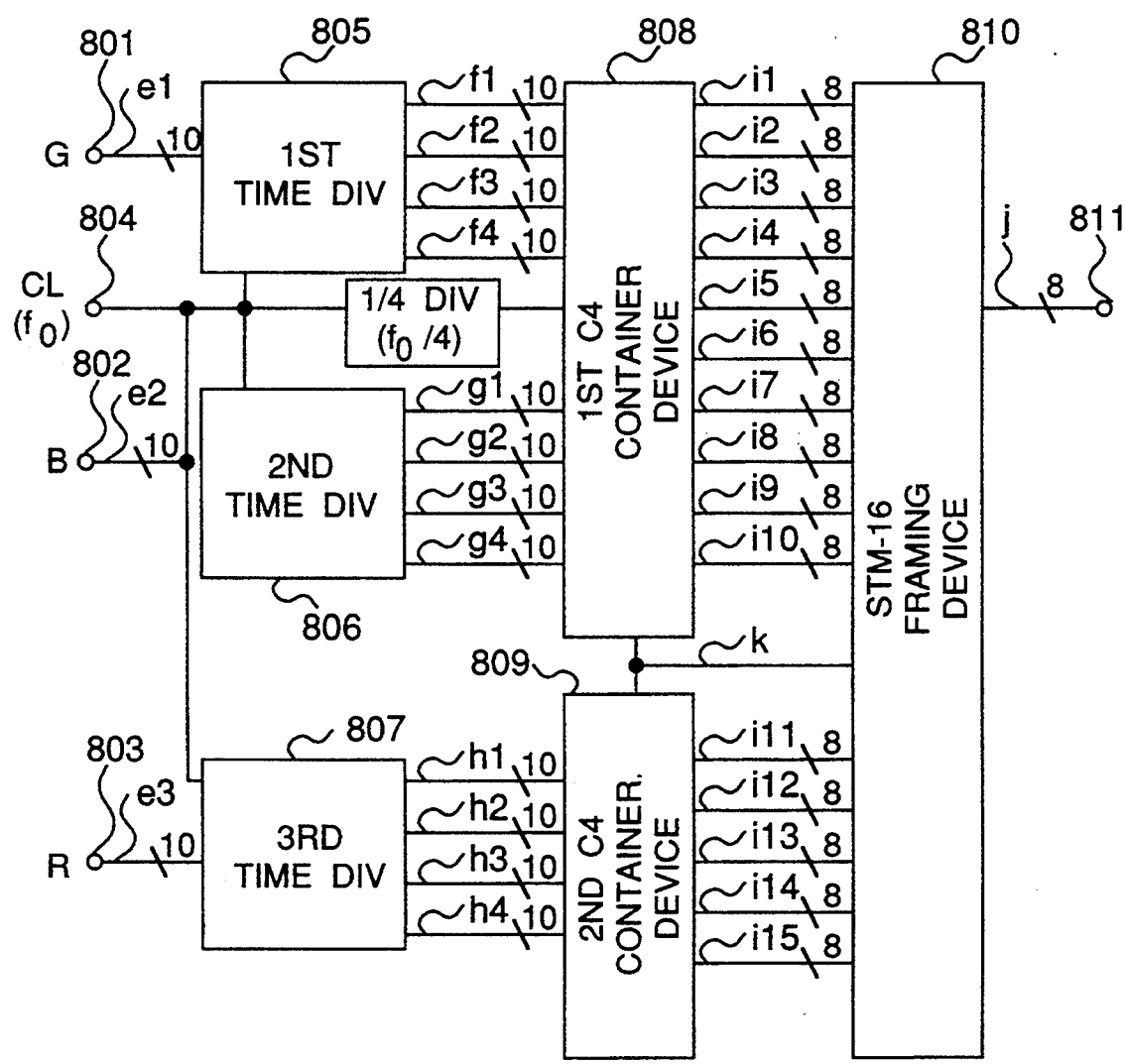
FIG. 8 is a block diagram of an HDTV signal transmitting apparatus according to the second embodiment of the present invention.

An HDTV signal transmission apparatus according to a second embodiment of the invention is described next with reference to FIGS. 8 and 9, which show block diagrams of the HDTV signal transmitter and receiver, respectively. The transmitted HDTV signal in the second embodiment is a 10-bit/word (i.e., ten quantization bits) GBR-format signal conforming, for example, to SMPTE 260M.

The HDTV signal transmitter (FIG. 8) comprises discrete green (G), blue (B), and red (R) signal input terminals 801, 802, and 803, respectively; a video clock input terminal 804 to which the video clock is input; a first time divider 805 to which the video clock and HDTV-G signal are input for time-dividing the HDTV-G signal into four separated G signals; a second time divider 806 to which the video clock and HDTV-B signal are input for time-dividing the HDTV-B signal into four separated B signals; a third time divider 807 to which the video clock and HDTV-R signal are input for time-dividing the HDTV-R signal into four separated R signals; a first C4 container device 808 for multiplexing the four separated G signals and B signals to ten C4 containers so that each bit of the same word is multiplexed to a different C4 container after frequency conversion by stuff-multiplexing using the ¼ frequency divided video clock as the write clock and the C4 clock as the read clock; a second C4 container device 809 for multiplexing the four separated R signals to five C4 containers after frequency conversion by stuff-multiplexing using the ¼ frequency divided video clock as the write clock and the C4 clock as the read clock; an STM-16 framing device 810 for multiplexing the fifteen C4 containers to the STM-16 frame according to CCITT recommendations, and outputting the C4 clock; and an STM-16 frame output terminal 811 for outputting the STM-16 frame.

According to one preferred embodiment, the quantization bit rate of the signal along each of lines e1, e2 and e3 is 10 bit/sampling at 74.25 MHz.

The operation of the HDTV signal transmitter thus comprised is described below.

Figure 11:
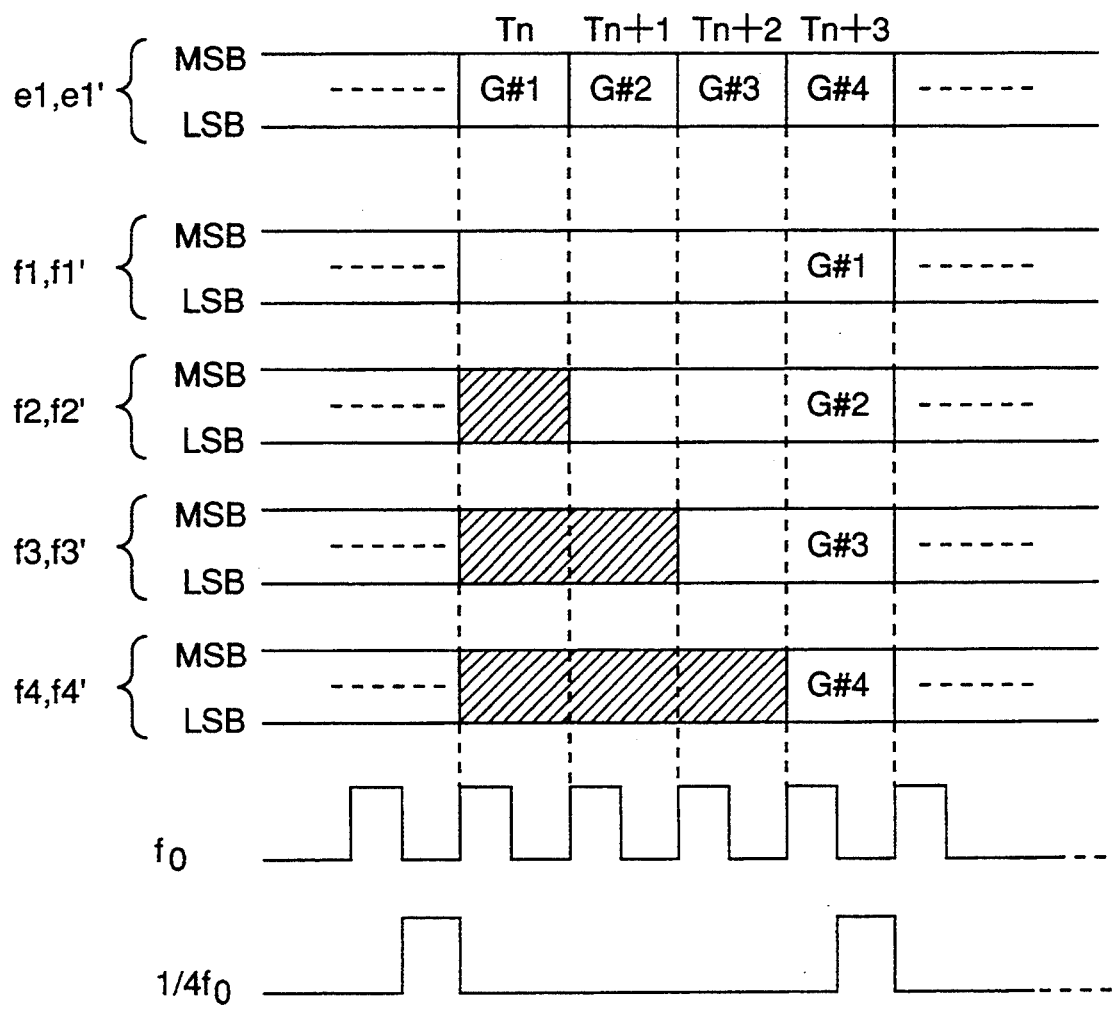
FIG. 11 is a format diagram of the separated G signal.

The HDTV-G signal (e1, FIGS. 10 and 11) input from the G-signal input terminal 801 is divided into four separated G-signals (f1–f4, FIG. 11) by the first time divider 805.

Figure 12:
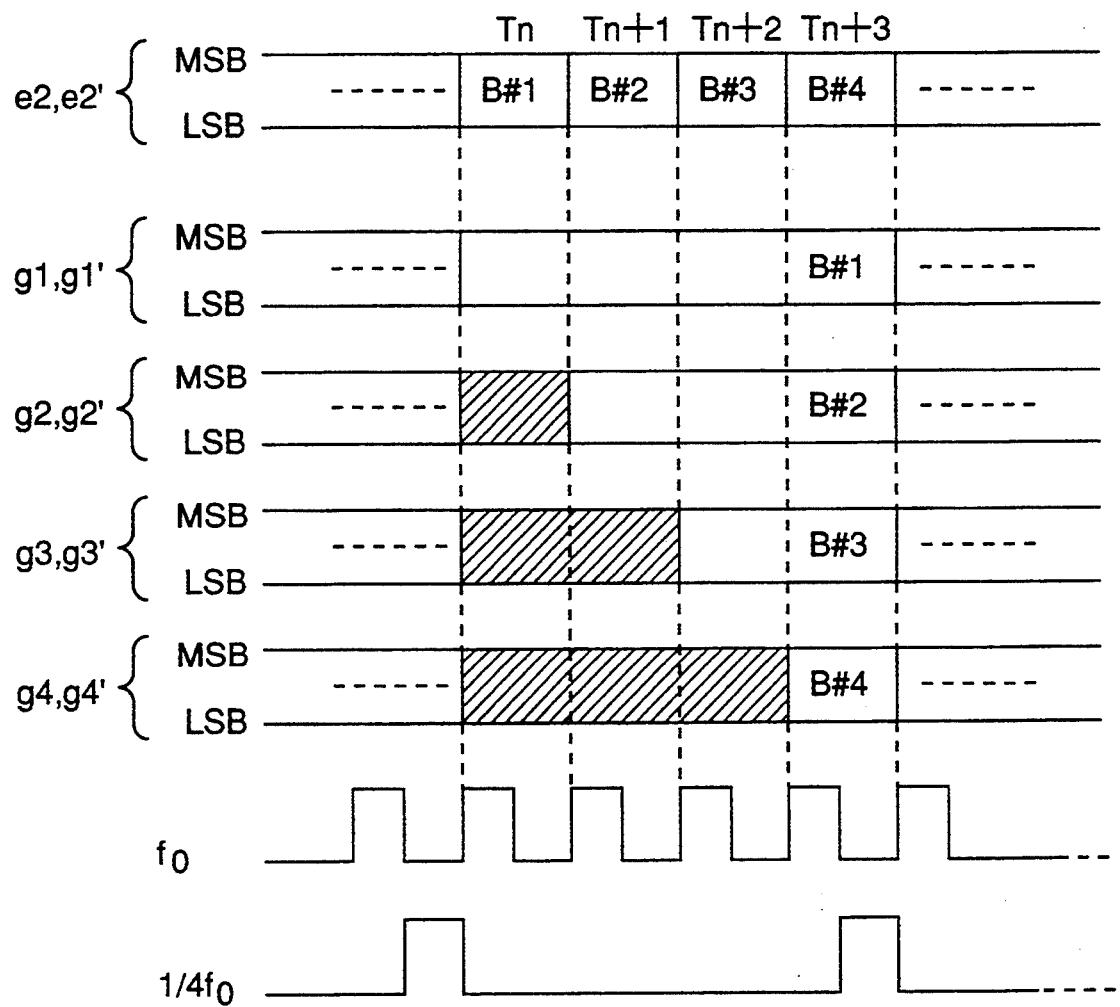
FIG. 12 is a format diagram of the separated B signal.

The HDTV-B signal (e2, FIGS. 10 and 12) input from the B-signal input terminal 802 is divided into four separated B-signals (g1–g4, FIG. 12) by the second time divider 806.

Figure 13:
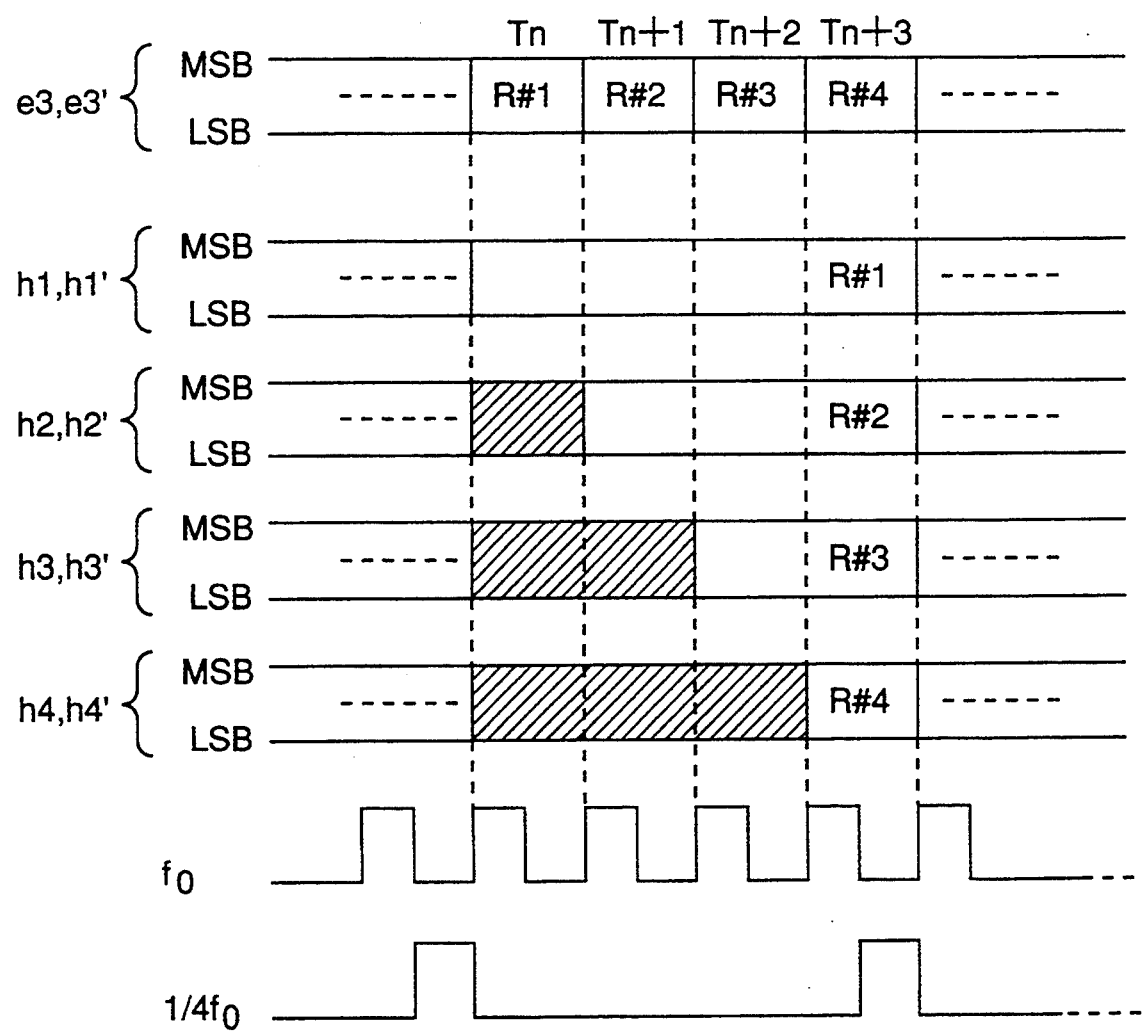
FIG. 13 is a format diagram of the separated R signal.

The HDTV-R signal (e3, FIGS. 10 and 13) input from the R-signal input terminal 803 is divided into four separated R-signals (h1–h4, FIG. 13) by the third time divider 807.

Figure 15:
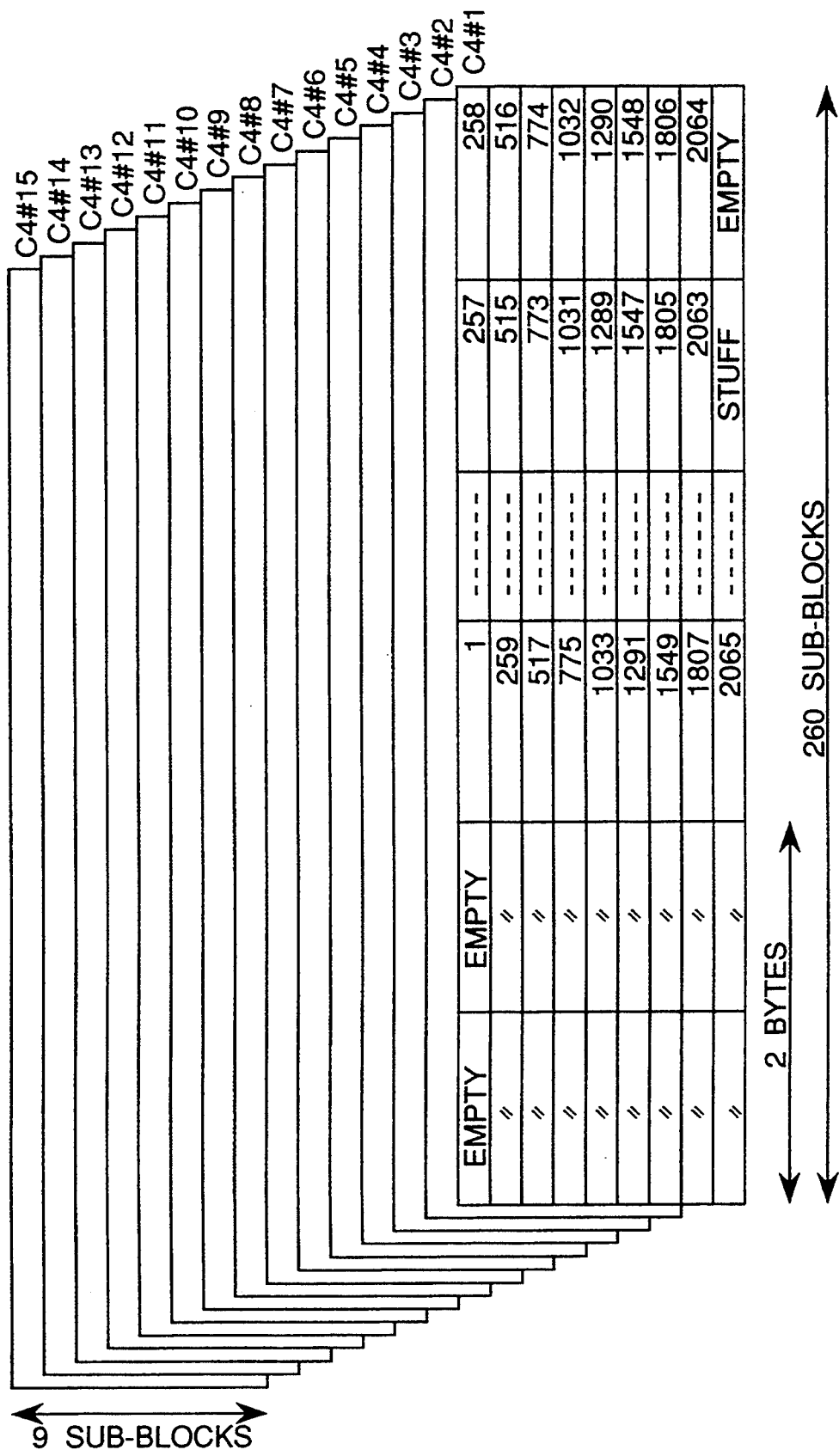
FIG. 15 is a format diagram of video block multiplexing in the second embodiment the present invention.

Based on the video clock and the C4 clock (k), the first C4 container device 808 stuff-multiplexes the four separated G-signal and B-signal to ten C4 containers (FIG. 14, i1–i10, and FIG. 15).

Also based on the video clock and the C4 clock (k), the second C4 container device 809 stuff-multiplexes the four separated R-signals to five C4 containers (i1-1–i15, FIG. 14, and FIG. 15). In this case, the (2N-1)th and 2Nth bits of the Mth input parallel line are connected to the (2M-1)th and 2Mth bits of the Nth register.

As shown in FIG. 15, one block is distributed across the fifteen C4 containers C4#1–C4#15, each of which is multiplexed.

The fifteen multiplexed C4 containers are then multiplexed to the STM-16 frame (j) by the STM-16 framing device 810, and output to the transmission path from the STM-16 frame output terminal 811.

The configuration of the HDTV receiver is described next.

Figure 9:
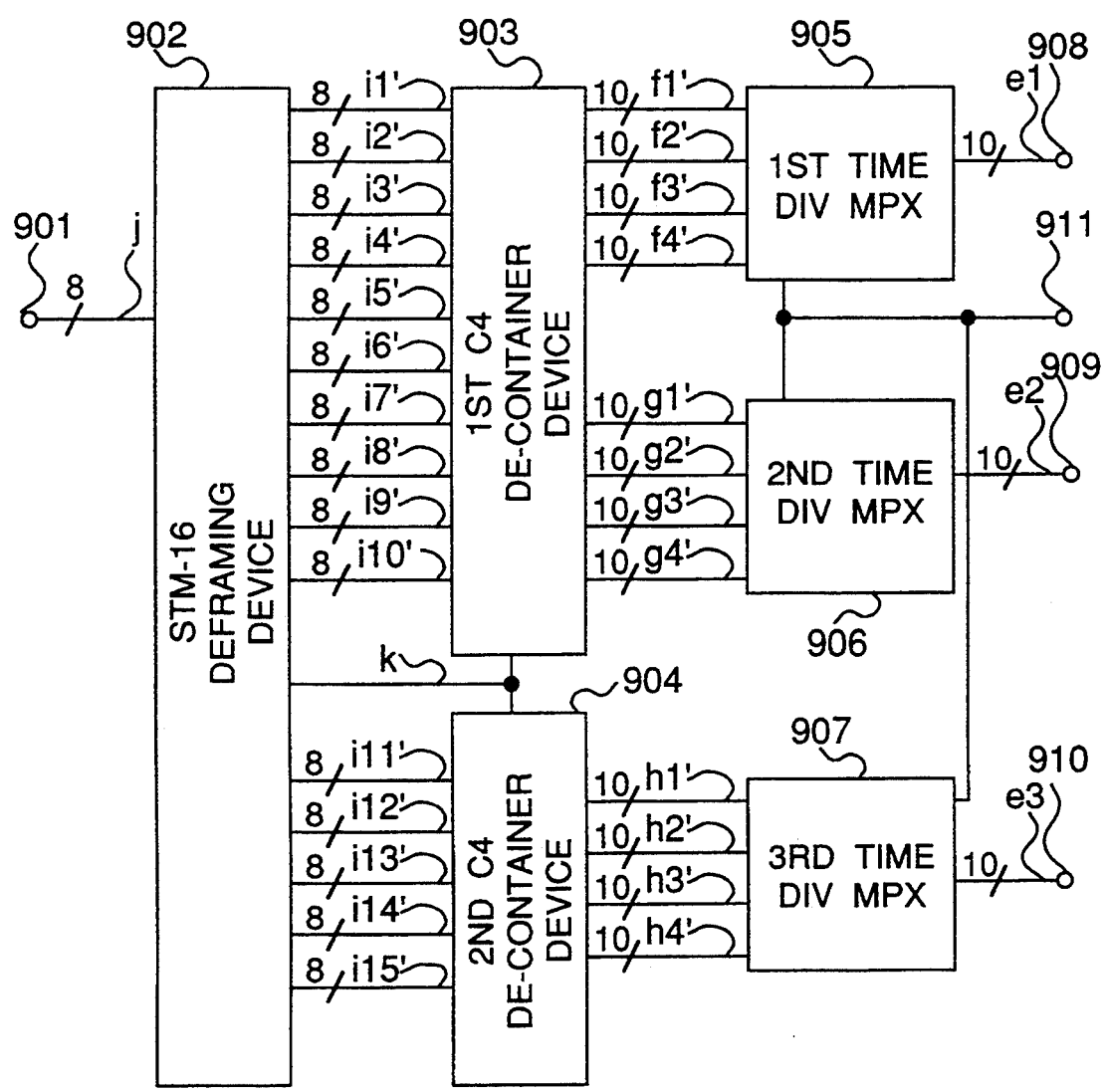
FIG. 9 is a block diagram of an HDTV signal receiving apparatus according to the second embodiment of the present invention.

As shown in FIG. 9, this receiver comprises an STM-16 frame input terminal 901 to which the STM-16 frame transmitted over the transmission path is input; a STM-16 deframing device 902 for demultiplexing the fifteen C4 containers from the STM-16 frame according to CCITT recommendations, and generating the C4 clock; a first C4 de-container device 903 for demultiplexing the four separated G-signal and B-signal by destuffing from the ten C4 containers based on the C4 clock, and generating the video clock; a second C4 decontainer device 904 for demultiplexing the four separated R-signals by destuffing from the five C4 containers based on the C4 clock, and generating the video clock; a first time-division multiplexer 905 to which are input the video clock and four separated G-signals for time-division multiplexing the separated G-signals to the HDTV-G signal; a second time-division multiplexer 906 to which are input the video clock and four separated B-signals for time-division multiplexing the separated B-signals to the HDTV-B signal; a third time-division multiplexer 907 to which are input the video clock and four separated R-signals for time-division multiplexing the separated R-signals to the HDTV-R signal; a G-signal output terminal 908 for outputting the HDTV-G signal; a B-signal output terminal 909 for outputting the HDTV-B signal; an R-signal output terminal 910 for outputting the HDTV-R signal; and a video clock output terminal 911 for outputting the video clock.

The operation of the HDTV signal receiver thus comprised is described below with reference to FIG. 9.

The STM-16 frame (J) is input from the STM-16 frame input terminal 901 to the STM-16 deframing device 902 for demultiplexing the fifteen C4 containers (i1′–i15′, FIG. 14) from the input STM-16 frame.

The first C4 de-container device 903 demultiplexes the four time-divided G-signals (f1′–f4′, FIG. 11) and B-signals (g1′–g4′, FIG. 12) from ten of the fifteen C4 containers, and outputs the C4 clock.

The second C4 de-container device 904 demultiplexes the four time-divided R-signals (h1′–h4′, FIG. 13) from the remaining five C4 containers. In this case, the (2M-1)th and 2Mth bits of the Nth register are connected to the (2N-1)th and 2Nth bits of the Mth output.

The first time-division multiplexer 905 multiplexes the four separated G-signals to the HDTV-G signal (e1′, FIG. 10), and outputs the multiplexed signal from the G-signal output terminal 908.

The second time-division multiplexer 906 multiplexes the four separated B-signals to the HDTV-B signal (e2′, FIG. 10), and outputs the multiplexed signal from the B-signal output terminal 909.

The third time-division multiplexer 907 multiplexes the four separated R-signals to the HDTV-R signal (e3′, FIG. 10), and outputs the multiplexed signal from the R-signal output terminal 910. The video clock is output from the video clock output terminal 911.

The present embodiment of the invention achieves a GBR-format HDTV signal transmission apparatus by expanding the functionality of the HDTV signal transmission apparatus according to the first embodiment, which transmits two signals (the luminance signal and color difference multiplex signal) as described above, using the five unused C4 containers (C4 #11–C4 #15) left by the first embodiment to transmit another signal.

It is to be noted that while ten quantization bits are used in the above embodiment, the invention shall not be so limited and a similar effect can be achieved when the number of quantization bits is within the range 5–9, inclusive, by simply changing the number of C4 containers used for transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An HDTV signal transmitting apparatus for transmitting a STM-16 frame signal converted from an N bit parallel HDTV signal, wherein N is a positive integer greater than one, said transmitting apparatus comprising:

time divider means for time dividing said N bit parallel HDTV signal into M separated HDTV signals, wherein M is a positive integer greater than one;

C4 container means for rearranging said M separated HDTV signals to N C4 containers, said C4 container means receives M parallel N-bit-parallel inputs and produces N parallel M-bit-parallel outputs and said C4 container means provides at least one bit from one N-bit-parallel input to one M-bit-parallel output; and STM-16 framing means for multiplexing the N C4 containers to said STM-16 frame.

2. An HDTV signal transmitting apparatus as claimed in claim 1, wherein said C4 container means provides the n-th bit (n is a number between 1 and N) of the m-th input (m is a number between 1 and M) to the m-th bit of the n-th output.

3. An HDTV signal transmitting apparatus as claimed in claim 1, wherein said N bit parallel HDTV signal is a combination of a luminance signal and a multiplex color difference signal.

4. An HDTV signal transmitting apparatus as claimed in claim 1, wherein said N bit parallel HDTV signal is a combination of a green signal, a blue signal and a red signal.

5. An HDTV signal transmitting apparatus for transmitting a STM-16 frame signal converted from a combination of a first N bit parallel HDTV signal and a second N bit parallel HDTV signal, wherein N is a positive integer greater than one, said transmitting apparatus comprising:

first time divider means for the dividing said first N bit parallel HDTV signal into Ma separated HDTV signals, wherein Ma is a positive integer greater than one;

second time divider means for time dividing said second N bit parallel HDTV signal into Mb separated HDTV signals, wherein Mb is a positive integer greater than one, and Ma+Mb=M;

C4 container means for rearranging said Ma and Mb separated HDTV signals to N C4 containers, said C4 container means receives M parallel N-bit-parallel inputs and produces N parallel M-bit-parallel outputs and said C4 container means provides at least one bit from one N-bit-parallel input to one M-bit-parallel output; and STM-16 framing means for multiplexing the N C4 containers to said STM-16 frame.

6. An HDTV signal transmitting apparatus as claimed in claim 5, wherein said first N bit parallel HDTV signal and a second N bit parallel HDTV signal are sampled at of and ½of frequencies, respectively.

7. An HDTV signal transmitting apparatus for transmitting a STM-16 frame signal converted from a combination of a first N bit parallel HDTV signal, a second N bit parallel HDTV signal and a third N bit parallel HDTV signal, wherein N is a positive integer greater than one, said transmitting apparatus comprising:

first time divider means for time dividing said first N bit parallel HDTV signal into Ma separated HDTV signals, wherein Ma is a positive integer greater than one;

second time divider means for time dividing said second N bit parallel HDTV signal into Mb separated HDTV signals, wherein Mb is a positive integer greater than one, and Ma+Mb=M;

third time divider means for time dividing said third N bit parallel HDTV signal into Mc separated HDTV signals, wherein Mc is a positive integer greater than one, first C4 container means for rearranging said Ma and Mb separated HDTV signals to N C4 containers, said C4 container means receives M parallel N-bit-parallel inputs and produces N parallel M-bit-parallel outputs and said C4 container means provides at least one bit from one N-bit-parallel input to one M-bit-parallel output;

second C4 container means for rearranging said Mc separated HDTV signals to W C4 containers, wherein W is a positive integer greater than one; and STM-16 framing means for multiplexing the N and W C4 containers to said STM-16 frame.

8. An HDTV signal receiving apparatus for receiving a STM-16 frame signal and for converting said STM-16 frame signal to an N bit parallel HDTV signal, wherein N is a positive integer greater than one, said receiving apparatus comprising:

STM-16 deframing means for demultiplexing said STM-16 frame signal to N C4 containers;

C4 de-container means for rearranging said N C4 containers to M separated HDTV signals, wherein M is a positive integer greater than one.., said C4 de-container means receives N parallel M-bit-parallel inputs and produces M parallel N-bit-parallel outputs and said C4 de-container means provides at least one bit from one M-bit-parallel input to one N-bit-parallel output; and time-division multiplexer means for time multiplexing said M separated HDTV signals to said N bit parallel HDTV signal.

9. An HDTV signal receiving apparatus as claimed in claim 8, wherein said C4 decontainer means provides the m-th bit (m is a number between 1 and M) of the n-th input (n is a number between 1 and N) to the n-th bit of the m-th output.

10. An HDTV signal receiving apparatus as claimed in claim 8, wherein said N bit parallel HDTV signal is a combination of luminance signal and multiplex color difference signal.

11. An HDTV signal receiving apparatus as claimed in claim 8, wherein said N bit parallel HDTV signal is a combination of green signal, blue signal and red signal.

12. An HDTV signal receiving apparatus for receiving a STM-16 frame signal and for converting said STM-16 frame signal to a combination of a first N bit parallel HDTV signal and a second N bit parallel HDTV signal, wherein N is a positive integer greater than one, said receiving apparatus comprising:

STM-16 deframing means for demultiplexing said STM-16 frame signal to N C4 containers;

C4 de-container means for rearranging said N C4 containers to Ma separated HDTV signals and Mb separated HDTV signals, wherein Ma and Mb are a positive integer greater than one, and Ma+Mb=M, said C4 de-container means receives N parallel M-bit-parallel inputs and produces M parallel N-bit-parallel outputs and said C4 de-container means provides at least one bit from one M-bit-parallel input to one N-bit-parallel output;
first time-division multiplexer means for time multiplexing said Ma separated HDTV signals to said first N bit parallel HDTV signal; and
second time-division multiplexer means for time multiplexing said Mb separated HDTV signals to said second N bit parallel HDTV signal.

13. An HDTV signal receiving apparatus as claimed in claim 12, wherein said first N bit parallel HDTV signal and a second N bit parallel HDTV signal are sampled at of and ½of frequencies, respectively.

14. An HDTV signal receiving apparatus for receiving a STM-16 frame signal and for converting said STM-16 frame signal to a combination of a first N bit parallel HDTV signal, a second N bit parallel HDTV signal and a third N bit parallel HDTV signal, wherein N is a positive integer greater than one, said receiving apparatus comprising:
STM-16 deframing means for demultiplexing said STM-16 frame signal to N C4 containers and W C4 containers, wherein W is a positive integer;
first C4 de-container means for rearranging said N C4 containers to Ma separated HDTV signals and Mb separated HDTV signals, wherein Ma and Mb are a positive integer greater than one, and Ma+Mb=M, said C4 decontainer means receives N parallel M-bit-parallel inputs and produces M parallel N-bit-parallel outputs and said C4 de-container means provides at least one bit from one M-bit-parallel input to one N-bit-parallel output;
second C4 de-container means for rearranging said W C4 containers to Mc separated HDTV signals;
first time-division multiplexer means for time multiplexing said Ma separated HDTV signals to said first N bit parallel HDTV signal;
second time-division multiplexer means for time multiplexing said Mb separated HDTV signals to said second N bit parallel HDTV signal; and
third time-division multiplexer means for time multiplexing said Mc separated HDTV signals to said third N bit parallel HDTV signal.

15. An HDTV signal transmission system comprising:
an HDTV signal transmitter apparatus for transmitting a STM-16 frame signal converted from an N bit parallel HDTV signal, wherein N is a positive integer greater than one, said transmitting apparatus comprising:
(a) time divider means for time dividing said N bit parallel HDTV signal into M separated HDTV signals, wherein M is a positive integer greater than one;
(b) C4 container means for rearranging said M separated HDTV signals to N C4 containers, said C4 container means receives M parallel N-bit-parallel inputs and produces N parallel M-bit-parallel outputs and said C4 container means provides at least one bit from one N-bit-parallel input to one M-bit-parallel output; and
(c) STM-16 framing means for multiplexing the N C4 containers to said STM-16 frame; and
an HDTV signal receiver apparatus for receiving said STM-16 frame signal and for converting said STM-16 frame signal to said N bit parallel HDTV signal, said receiving apparatus comprising:
(a) STM-16 deframing means for demultiplexing said STM-16 frame signal to N C4 containers;
(b) C4 de-container means for rearranging said N C4 containers to M separated HDTV signals, said C4 de-container means receives N parallel M-bit-parallel inputs and produces M parallel N-bit-parallel outputs and said C4 de-container means provides at least one bit from one M-bit-parallel input to one N-bit-parallel output; and
(c) time-division multiplexer means for time multiplexing said M separated HDTV signals to said N bit parallel HDTV signal.

16. An HDTV signal transmission system comprising:
an HDTV signal transmitter apparatus for transmitting a STM-16 frame signal converted from a combination of a first N bit parallel HDTV signal and a second N bit parallel HDTV signal, wherein N is a positive integer greater than one, said transmitting apparatus comprising:
(a) first time divider means for dividing said first N bit parallel HDTV signal into Ma separated HDTV signals, wherein Ma is a positive integer greater than one;
(b) second time divider means for time dividing said second N bit parallel HDTV signal into Mb separated HDTV signals, wherein Mb is a positive integer greater than one, and Ma+Mb=M;
(c) C4 container means for rearranging said Ma and Mb separated HDTV signals to N C4 containers, said C4 container means receives M parallel N-bit-parallel inputs and produces N parallel M-bit-parallel outputs and said C4 container means provides at least one bit from one N-bit-parallel input to one M-bit-parallel output; and
(d) STM-16 framing means for multiplexing the N C4 containers to said STM-16 frame; and
an HDTV signal receiver apparatus for receiving said STM-16 frame signal and for converting said STM-16 frame signal to a combination of said first N bit parallel HDTV signal and said second N bit parallel HDTV signal, said receiving apparatus comprising:
(a) STM-16 deframing means for demultiplexing said STM-16 frame signal to said N C4 containers;
(b) C4 de-container means for rearranging said N C4 containers to said Ma separated HDTV signals and said Mb separated HDTV signals, said C4 de-container means receives N parallel M-bit-parallel inputs and produces M parallel N-bit-parallel outputs and said C4 de-container means provides at least one bit from one M-bit-parallel input to one N-bit-parallel output;
(c) first time-division multiplexer means for time multiplexing said Ma separated HDTV signals to said first N bit parallel HDTV signal; and
(d) second time-division multiplexer means for time multiplexing said Mb separated HDTV signals to said second N bit parallel HDTV signal.

17. An HDTV signal transmission system comprising:
an HDTV signal transmitter apparatus for transmitting a STM-16 frame signal converted from a combination of a first N bit parallel HDTV signal, a second N bit parallel HDTV signal and a third N bit parallel HDTV signal, wherein N is a positive integer greater than one, said transmitting apparatus comprising:

(a) first time divider means for time dividing said first N bit parallel HDTV signal into Ma separated HDTV signals, wherein Ma is a positive integer greater than one;
(b) second time divider means for time dividing said second N bit parallel HDTV signal into Mb separated HDTV signals, wherein Mb is a positive integer greater than one, and Ma+Mb=M;
(c) third time divider means for time dividing said third N bit parallel HDTV signal into Mc separated HDTV signals, wherein Mc is a positive integer greater than one;
(d) first C4 container means for rearranging said Ma and Mb separated HDTV signals to N C4 containers, said C4 container means receives M parallel N-bit-parallel inputs and produces N parallel M-bit-parallel outputs and said C4 container means provides at least one bit from one N-bit-parallel input to one M-bit-parallel output;
(e) second C4 container means for rearranging said Mc separated HDTV signals to W C4 containers, wherein W is a positive integer greater than one; and
(f) STM-16 framing means for multiplexing the N and W C4 containers to said STM-16 frame; and an HDTV signal receiver apparatus for receiving said STM-16 frame signal and for converting said STM-16 frame signal to a combination of said first N bit parallel HDTV signal, said second N bit parallel HDTV signal and said third N bit parallel HDTV signal, said receiving apparatus comprising:
(a) STM-16 deframing means for demultiplexing said STM-16 frame signal to said N C4 containers and said W C4 containers;
(b) first C4 de-container means for rearranging said N C4 containers to said Ma separated HDTV signals and said Mb separated HDTV signals, said C4 de-container means receives N parallel M-bit-parallel inputs and produces M parallel N-bit-parallel outputs and said C4 de-container means provides at least one bit from one M-bit-parallel input to one N-bit-parallel output;
(c) second C4 de-container means for rearranging said W C4 containers to said Mc separated HDTV signals;
(d) first time-division multiplexer means for time multiplexing said Ma separated HDTV signals to said first N bit parallel HDTV signal;
(e) second time-division multiplexer means for time multiplexing said Mb separated HDTV signals to said second N bit parallel HDTV signal; and
(f) third time-division multiplexer means for time multiplexing said Mc separated HDTV signals to said third N bit parallel HDTV signal.

* * * * *

UNITED STATES PATENT AND TRADEMARK OFFICE
CERTIFICATE OF CORRECTION

PATENT NO.     : 5,444,711
DATED          : August 22, 1995
INVENTOR(S)    : Noboru Mizuguchi et al.

It is certified that error appears in the above-identified patent and that said Letters Patent is hereby corrected as shown below:

```
     Title page, item    [56] References Cited, U.S. Patent
4,890,283, change inventor's name to Tsinberg.

Column 11, line 60, claim 6, before "frequencies" change
"of and 1/2of" to --fo and 1/2fo--.

Column 12, line 33, after "one" delete --..--.

Column 13, line 12, claim 13, after "sampled at" change "of
and 1/2of" to --fo and 1/2fo--.
```

Signed and Sealed this

Sixteenth Day of January, 1996

*Attest:*

BRUCE LEHMAN

*Attesting Officer*     *Commissioner of Patents and Trademarks*